United States Patent
Morita

(10) Patent No.: US 10,249,417 B2
(45) Date of Patent: Apr. 2, 2019

(54) FERRITE SINTERED MAGNET

(71) Applicant: TDK Corporation, Tokyo (JP)

(72) Inventor: Hiroyuki Morita, Tokyo (JP)

(73) Assignee: TDK CORPORATION, Tokyo (JP)

(*) Notice: Subject to any disclaimer, the term of this patent is extended or adjusted under 35 U.S.C. 154(b) by 203 days.

(21) Appl. No.: 15/399,887

(22) Filed: Jan. 6, 2017

(65) Prior Publication Data

US 2017/0207012 A1    Jul. 20, 2017

(30) Foreign Application Priority Data

Jan. 15, 2016 (JP) .................. 2016-006463

(51) Int. Cl.
| | |
|---|---|
| *H01F 1/08* | (2006.01) |
| *H01F 1/10* | (2006.01) |
| *C01G 49/00* | (2006.01) |
| *C01G 51/00* | (2006.01) |
| *C04B 35/26* | (2006.01) |
| *H01F 1/053* | (2006.01) |
| *C04B 35/626* | (2006.01) |
| *C04B 35/645* | (2006.01) |

(52) U.S. Cl.
CPC ....... *H01F 1/0536* (2013.01); *C01G 49/0072* (2013.01); *C01G 51/68* (2013.01); *C04B 35/265* (2013.01); *C04B 35/2633* (2013.01); *C04B 35/6262* (2013.01); *C04B 35/6263* (2013.01); *C04B 35/645* (2013.01); *H01F 1/086* (2013.01); *H01F 1/10* (2013.01); *C04B 2235/3208* (2013.01); *C04B 2235/3213* (2013.01); *C04B 2235/3215* (2013.01); *C04B 2235/3227* (2013.01); *C04B 2235/3241* (2013.01); *C04B 2235/3262* (2013.01); *C04B 2235/3268* (2013.01); *C04B 2235/3274* (2013.01); *C04B 2235/3275* (2013.01); *C04B 2235/3277* (2013.01); *C04B 2235/3418* (2013.01); *C04B 2235/605* (2013.01); *C04B 2235/767* (2013.01); *C04B 2235/96* (2013.01)

(58) Field of Classification Search
CPC .. H01G 1/10; C01G 49/0072; C01G 49/0036; C01G 49/0054; C04B 35/3641; C04B 35/2633

See application file for complete search history.

(56) References Cited

U.S. PATENT DOCUMENTS

| | | |
|---|---|---|
| 2012/0161910 A1 | 6/2012 | Nagaoka et al. |
| 2015/0170811 A1 | 6/2015 | Tanigawa et al. |

FOREIGN PATENT DOCUMENTS

| | | |
|---|---|---|
| WO | 2011/004791 A1 | 1/2011 |
| WO | 2014/021426 A1 | 2/2014 |

*Primary Examiner* — C Melissa Koslow

(74) *Attorney, Agent, or Firm* — Oliff PLC

(57) ABSTRACT

A ferrite sintered magnet includes a composition expressed by a formula (1) of $Ca_{1-w-x}La_wA_xFe_zCo_mMn_aO_{19}$. In the formula (1), "w", "x", "z", "m", and "a" satisfy a formula (2) of $0.21 \leq w \leq 0.62$, a formula (3) of $0.02 \leq x \leq 0.46$, a formula (4) of $7.43 \leq z \leq 11.03$, a formula (5) of $0.18 \leq m \leq 0.41$, and a formula (6) of $0.046 \leq a \leq 0.188$. In the formula (1), "A" is at least one kind of element selected from a group consisting of Sr and Ba.

8 Claims, 7 Drawing Sheets

FERRITE SINTERED MAGNET

BACKGROUND OF THE INVENTION

1. Field of the Invention

The present invention relates to a ferrite sintered magnet.

2. Description of the Related Art

Hexagonal crystal based M-type (magnetoplumbite-type) Sr ferrite or Ba ferrite is known as a material of a permanent magnet consisting of an oxide. Magnetic materials consisting of these ferrites serve as a permanent magnet in the form of a ferrite sintered magnet, a bond magnet or the like.

In recent years, with the miniaturization and increasingly high performance of electronic components, permanent magnets have also been required to include high magnetic characteristics.

Residual magnetic flux density (Br) and coercivity (HcJ) are generally employed as indicators of magnetic characteristics of a permanent magnet. A permanent magnet is judged to have higher magnetic characteristics when these indicators are higher.

For example, Patent Document 1 shows a ferrite magnetic material having high Br and HcJ but also high Hk/HcJ by containing a certain amount of a Si component.

Patent Document 2 shows a ferrite magnetic material having high Br and HcJ by containing a certain amount of a Si component and further containing a certain amount of an Al component and a Cr component.

As mentioned above, combinations of elements added to main components have been variously changed in order to obtain both good Br and HcJ, but it is still unclear what kind of combination of added elements provides high magnetic characteristics.

In addition to having higher Br and HcJ, it is preferable for a permanent magnet to also have a high ratio of a value (Hk) of a magnetic field when magnetization is 90% of Br to HcJ, which is a so-called squareness ratio (Hk/HcJ).

Excellent formability is needed to industrially manufacture a large quantity of products with a stable quality.

However, it has never been easy to obtain a permanent magnet having good magnetic characteristics and good formability, since when one of magnetic characteristics or formability improves, the other magnetic characteristics or formability end up lowering, for example.

Patent Document 1: WO 2011/004791
Patent Document 2: WO 2014/021426

SUMMARY OF THE INVENTION

The present invention was accordingly made in view of such circumstances. It is an object of the invention to provide a ferrite sintered magnet having highly maintained Br and HcJ and also having favorable formability.

In order to achieve the above-described object, a ferrite sintered magnet of the present invention is as below.

[1] A ferrite sintered magnet including a composition expressed by a following formula (1), $$Ca_{1-w-x}La_wA_xFe_zCo_mMn_aO_{19} \tag{1}$$

wherein "w", "x", "z", "m", and "a" in the formula (1) satisfy following formulae (2), (3), (4), (5), and (6) and $$0.21 \leq w \leq 0.62 \tag{2}$$

$$0.02 \leq x \leq 0.46 \tag{3}$$

$$7.43 \leq z \leq 11.03 \tag{4}$$

$$0.18 \leq m \leq 0.41 \tag{5}$$

$$0.046 \leq a \leq 0.188 \tag{6}$$

"A" in the formula (1) is at least one kind of element selected from a group consisting of Sr and Ba.

The present invention makes it possible to provide a ferrite sintered magnet having a high formability while favorably maintaining Br and HcJ.

The following modes are exemplified as specific modes of [1] above.

[2] The ferrite sintered magnet described in [1] above, wherein w/m is 0.84 to 2.48.

[3] The ferrite sintered magnet described in [1] or [2] above, wherein Si is further contained at 0.52 mass % to 1.18 mass % in terms of $SiO_2$.

[4] The ferrite sintered magnet described in any of [1] to [3] above, wherein Cr is further contained at 0.98 mass % or less in terms of $Cr_2O_3$.

DESCRIPTION OF THE PREFERRED EMBODIMENTS

The present invention will be described in detail based on the present embodiment with reference to the drawings, but is not limited only to the embodiment described below.

The following constituents include those that could be easily conceived by a person skilled in the art and those that are substantively identical to. Furthermore, the following constituents can be appropriately combined.

Ferrite Sintered Magnet

An overall configuration of a ferrite sintered magnet according to the present embodiment will be described.

Figure 1:
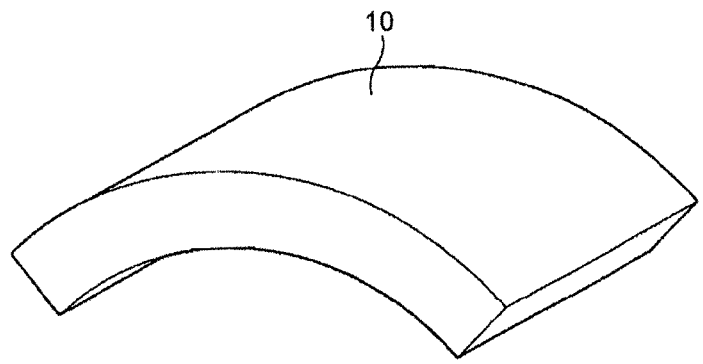
FIG. 1 is a perspective view schematically showing a ferrite sintered magnet according to an embodiment of the present invention.

FIG. 1 is a perspective view schematically showing the ferrite sintered magnet of the present embodiment. A ferrite sintered magnet 10 has a shape where end surfaces are curved in a circular arc shape, which is generally called an arc segment shape, a C form shape, a tile-type shape, or a bow shape. The ferrite sintered magnet 10 is favorably employed as a magnet for motors, for example.

The ferrite sintered magnet 10 according to an embodiment of the present invention consists of a ferrite having a main phase of a ferrite phase having a hexagonal crystal structure.

A magnetoplumbite-type (M-type) ferrite (hereafter, referred to as "M-type ferrite") is preferable as the above-mentioned ferrite phase. Incidentally, a main phase consisting of a magnetoplumbite-type (M-type) ferrite is particularly called an "M phase". The ferrite sintered magnet usually consists of a "main phase (crystal grain)" and a "grain boundary", and the "main phase consisting of a ferrite phase" means that this "main phase" is a ferrite phase. A proportion of the main phase occupying a sintered body is preferably 95 volume percent or more.

The ferrite sintered magnet is in a mode of a sintered body, and has a structure including a crystal grain (main phase) and a grain boundary. An average crystal grain diameter of the crystal grain in this sintered body is preferably 2 μm or less, and is more preferably 0.5 μm to 1.6 μm. A high HcJ becomes easy to be obtained by having such an average crystal grain diameter. Incidentally, the average crystal grain diameter referred to herein is an arithmetic mean value of a grain diameter in an axis of hard magnetization (a axis) direction of crystal grains in a sintered body of M-type ferrite. A crystal grain diameter of a sintered body of a ferrite magnetic material can be measured by a scanning electron microscope.

The ferrite sintered magnet of the present embodiment has a composition expressed by a following formula (1), for example.

$$Ca_{1-w-x}La_wA_xFe_zCo_mMn_aO_{19} \quad (1)$$

In the formula (1), "A" is at least one kind of element selected from a group consisting of Sr and Ba.

In the formula (1), "w", "x", "z", "m", and "a" respectively indicate atomic ratios of La, "A", Fe, Co, and Mn and satisfy all of following formulae (2), (3), (4), (5), and (6).

$$0.21 \leq w \leq 0.62 \quad (2)$$

$$0.02 \leq x \leq 0.46 \quad (3)$$

$$7.43 \leq z \leq 11.03 \quad (4)$$

$$0.18 \leq m \leq 0.41 \quad (5)$$

$$0.046 \leq a \leq 0.188 \quad (6)$$

Incidentally, a composition ratio of oxygen is influenced by composition ratios of each metal element and valences of each element (ion), and increases/decreases so as to maintain electrical neutrality within a crystal. In a firing step mentioned below, oxygen deficiency may occur when a firing atmosphere is configured as a reducing atmosphere.

Hereinafter, composition of the above-mentioned ferrite sintered magnet will be described in more detail.

The ferrite sintered magnet of the present embodiment may contain $SiO_2$ or $Cr_2O_3$ as an accessory component as described below, or may further contain another accessory component, such as a Ca component.

However, the ferrite sintered magnet of the present embodiment contains Ca as a component configuring the ferrite phase of the main phase as previously mentioned. Thus, when Ca is contained as an accessory component, an amount of Ca analyzed from the sintered body represents a total amount of the main phase and the accessory component. That is, when a Ca component is employed as an accessory component, the atomic ratio (1-w-x) of Ca in the general formula (1) represents a value that also includes the accessory component. A range of the atomic ratio (1-w-x) is specified based on a composition analyzed after sintering, hence can be applied to both a case where the Ca component is contained as an accessory component and a case where the Ca component is not contained as an accessory component.

The atomic ratio of La (w) is in a range of 0.21≤w≤0.62, and this range achieves a good formability while high Br and HcJ can be obtained. This range can also improve an anisotropic magnetic field. In view of the above, the atomic ratio of La is preferably 0.24 to 0.56, and is more preferably 0.31 to 0.51.

An element indicated by "A" is at least one kind of element selected from a group consisting of Sr and Ba, but "A" is more preferably Sr alone or Ba alone. This can reduce the number of kinds of elements and a workload of manufacturing. Incidentally, both Sr and Ba may be contained.

The atomic ratio of "A" (x) in the composition of metal elements configuring the above-mentioned ferrite sintered magnet is in a range of 0.02≤x≤0.46, and this range achieves a good formability while high Br and HcJ can be obtained. In view of the above, the atomic ratio of "A" (x) is preferably 0.04 to 0.32, and is more preferably 0.07 to 0.23.

Incidentally, when both Sr and Ba are contained, their total amount is preferably in the above-mentioned range of the atomic ratio of "A" (x).

The atomic ratio of Fe (z) is in a range of 7.43≤z≤11.03, and this range achieves a good formability while high Br and HcJ can be obtained. In view of the above, the atomic ratio of Fe (z) is preferably 8.02 to 10.65, is more preferably 8.51 to 10.23, and is even more preferably 8.72 to 9.52.

The atomic ratio of Co (m) is in a range of 0.18≤m≤0.41, and this range achieves a good formability while high Br and HcJ can be obtained. This range also improves an anisotropic magnetic field. In view of the above, the atomic ratio of Co is preferably 0.18 to 0.36, and is more preferably 0.21 to 0.28.

The atomic ratio of Mn (a) is in a range of 0.046≤a≤0.188, and this range achieves a good formability while high Br and HcJ can be obtained. In view of the above, the atomic ratio of Mn is preferably 0.046 to 0.137, is more preferably 0.049 to 0.114, and is even more preferably 0.054 to 0.079.

Incidentally, accessory components of the ferrite sintered magnet, such as Cr and Si, may be contained in either of the main phase and the grain boundary of the ferrite sintered magnet. In the ferrite sintered magnet, the main phase is a portion other than the accessory component of the whole.

Regarding the atomic ratio of La (w) and the atomic ratio of Co (m), w/m is preferably 0.84 to 2.48. This achieves a good formability while high Br and HcJ can be obtained. In view of the above, w/m is more preferably 1.24 to 2.04.

The ferrite sintered magnet of the present embodiment may contain Si as an accessory component. An amount of Si in terms of $SiO_2$ is preferably 0.52 mass % to 1.18 mass % of the entire ferrite sintered magnet. This results in a ferrite sintered magnet having a good sinterability, an appropriately adjusted crystal grain diameter of the sintered body, and favorably controlled magnetic characteristics. As a result, it becomes possible to obtain a high Hk/HcJ and a good formability while high Br and HcJ are obtained. In view of the above, the amount of $SiO_2$ is more preferably 0.59 mass % to 1.01 mass % of the entire ferrite sintered magnet, and is even more preferably 0.64 mass % to 0.92 mass % of the entire ferrite sintered magnet.

The ferrite sintered magnet of the present embodiment may contain Cr as an accessory component. An amount of Cr in terms of $Cr_2O_3$ is preferably 0.98 mass % or less of the entire ferrite sintered magnet, is more preferably 0.30 mass % or less of the entire ferrite sintered magnet, and is even more preferably 0.08 mass % of the entire ferrite sintered magnet of the entire ferrite sintered magnet. This achieves a good formability.

The ferrite sintered magnet contains the above-mentioned composition of metal elements and the accessory component such as $SiO_2$, but the composition of the ferrite sintered magnet can be measured by fluorescent X-ray quantitative analysis. Moreover, presence of the main phase can be confirmed by X-ray diffraction, electron beam diffraction, or the like.

Boron B may be contained as the accessory component as, for example, $B_2O_3$. An amount of B as $B_2O_3$ is preferably 0.5 mass % or less with respect to the entire ferrite sintered magnet. This makes it possible to lower a calcination temperature or firing temperature at the time of obtaining the ferrite sintered magnet, to obtain the ferrite sintered magnet with good productivity, and to reduce lowering of saturation magnetization of the ferrite sintered magnet.

Furthermore, the ferrite sintered magnet of the present embodiment may contain Ga, Mg, Cu, Ni, Zn, In, Li, Ti, Zr, Ge, Sn, V, Nb, Ta, Sb, As, W, Mo, or the like in the form of an oxide as the accessory component. Amounts of these in the entire ferrite sintered magnet overall, in terms of an oxide of stoichiometric composition of each atom, preferably not more than 5 mass % of gallium oxide, not more than 5 mass % of magnesium oxide, not more than 5 mass % of copper oxide, not more than 5 mass % of nickel oxide, not more than 5 mass % of zinc oxide, not more than 3 mass % of indium oxide, not more than 1 mass % of lithium oxide, not more than 3 mass % of titanium oxide, not more than 3 mass % of zirconium oxide, not more than 3 mass % of germanium oxide, not more than 3 mass % of tin oxide, not more than 3 mass % of vanadium oxide, not more than 3 mass % of niobium oxide, not more than 3 mass % of tantalum oxide, not more than 3 mass % of antimony oxide, not more than 3 mass % of arsenic oxide, not more than 3 mass % of tungsten oxide, and not more than 3 mass % of molybdenum oxide. However, when plural kinds of these are combined and contained, their total is desirably configured to be not more than 5 mass % in order to avoid lowering of the magnetic characteristics.

An alkaline metal element (Na, K, Rb, or the like) may be contained in raw materials of the ferrite sintered magnet, and may be contained in the ferrite sintered magnet provided it is unavoidably contained. An amount of the alkaline metal element that does not greatly influence the magnetic characteristics is not more than 3 mass %.

Method of Manufacturing Ferrite Sintered Magnet

Next, a method of manufacturing a ferrite sintered magnet representing an embodiment of the present invention will be specifically described.

The following embodiment shows an example of the method of manufacturing the ferrite sintered magnet. In the present embodiment, the ferrite sintered magnet can be manufactured by going through a blending step, a calcining step, a pulverizing step, a pressing step, and a firing step. A drying step and a kneading step of a finely pulverized slurry may be included between the pulverizing step and the pressing step, and a degreasing step may be included between the pressing step and the firing step. Each step will be described below.

<Blending Step>

In the blending step, raw materials of the ferrite sintered magnet are blended to obtain a raw material mixture. First, examples of raw materials of the ferrite sintered magnet include a compound (raw material compound) that contains one type or two or more types of elements configuring this ferrite sintered magnet. The raw material compound is preferably in a powdered form, for example.

Examples of the raw material compound include an oxide of each of the elements or a compound to be an oxide by firing (carbonates, hydroxides, nitrates etc.). For example, the raw material compound includes $CaCO_3$, $La_2O_3$, $SrCO_3$, $Fe_2O_3$, $CO_3O_4$, MnO, $Cr_2O_3$, $SiO_2$, or the like. An average particle diameter of a powder of the raw material compound is preferably about 0.1 μm to 2.0 μm, for example, in view of enabling a homogeneous blending.

For example, the blending can be performed by weighing and mixing each of the raw materials such that a desired composition of a ferrite magnetic material is obtained, and then by performing mixing and pulverizing treatments for about 0.1 hours to 20 hours using a wet attritor, a ball mill, and the like.

Incidentally, in this blending step, there is no need to mix all of the raw materials, and some of the raw materials may be configured to be added after calcining mentioned below. For example, a raw material of Si (e.g. $SiO_2$) and a raw material of Cr (e.g. $Cr_2O_3$) that are accessory components or a raw material of Mn (e.g. MnO) and a raw material of Ca (e.g. $CaCO_3$) that are a constituent element of the composition of metal elements may be added in the later described pulverizing (particularly, fine pulverizing) step after the later described calcining, or may be added in the blending step and the pulverizing step. The timing of addition should be determined such that a desired composition or desired magnetic characteristics are easily obtained.

<Calcining Step>

In the calcining step, a raw material powder obtained in the blending step is calcined. Calcining is preferably performed in, for example, an oxidizing atmosphere in in air, or the like. A temperature of the calcining is preferably in a temperature range of 1100° C. to 1400° C., is more preferably 1100° C. to 1300° C., and is even more preferably 1150° C. to 1300° C. A time of calcining can be 1 second to 10 hours, and is preferably 1 second to 5 hours.

A calcined body obtained by calcining includes 70% or more of the main phase (M phase) mentioned above. A primary particle diameter of the calcined body is preferably 10 μm or less, is more preferably 5 μm or less, and is even more preferably 2 μm or less.

<Pulverizing Step>

In the pulverizing step, the calcined body that has attained a granular form or a lump-like form in the calcining step is pulverized and made into a powdered form again. This facilitates pressing in the pressing step mentioned below. As mentioned above, in this pulverizing step, raw materials that were not blended in the blending step may be added (later addition of raw materials). The pulverizing step may be performed in a step of two stages where the calcined body is pulverized so as to become a coarse powder (coarse pulverizing) and then this is further finely pulverized (fine pulverizing), for example.

The coarse pulverizing is performed using a vibrating mill etc. until the average particle diameter becomes 0.5 µm to 5.0 µm. In the fine pulverizing, a coarsely pulverized material obtained by the coarse pulverizing is further pulverized by a wet attritor, a ball mill, a jet mill, or the like.

In the fine pulverizing, fine pulverizing is performed such that the average particle diameter of an obtained finely pulverized material is preferably about 0.08 µM to 2.0 µm, is more preferably about 0.1 µm to 1.0 µm, and is even more preferably about 0.1 µm to 0.5 µm. A specific surface area (obtained by, for example, a BET method) of the finely pulverized material is preferably about 4 $m^2/g$ to 12 $m^2/g$. A preferred pulverizing time differs depending on a method of pulverizing. For example, the pulverizing time is preferably about 30 minutes to 20 hours in the case of a wet attritor, and the pulverizing time is preferably about 1 hour to 50 hours in wet pulverizing by a ball mill.

When adding some of the raw materials in the pulverizing step, this addition can be performed during the fine pulverizing, for example. In the present embodiment, $SiO_2$ of a Si component, $CaCO_3$ of a Ca component, or the like can be added during the fine pulverizing, but these may also be added in the blending step or the coarse pulverizing step.

In the fine pulverizing step, in the case of a wet method, a non-aqueous solvent such as toluene and xylene can be employed as a dispersion medium as well as an aqueous solvent such as water. Using a non-aqueous solvent tends to obtain high orientation during a later described wet pressing. On the other hand, using an aqueous solvent such as water is advantageous in terms of productivity.

In the fine pulverizing step, a publicly known polyhydric alcohol or dispersant, for example, may be added in order to enhance a degree of orientation of a sintered body obtained after firing.

<Pressing and Firing Steps>

In the pressing and firing steps, a pulverized material (preferably a finely pulverized material) obtained after the pulverizing step is pressed to obtain a green compact, and then this green compact is fired to obtain the sintered body. Pressing can be performed by any of methods of dry pressing, wet pressing, or ceramic injection molding (CIM), but the pressing is preferably CIM or wet pressing, and is particularly preferably CIM.

In the dry pressing method, for example, a dried magnetic powder is applied with a magnetic field while being pressed, whereby the green compact is formed, and then the green compact is fired. Since a dried magnetic powder is generally pressed inside a metal mold in the dry pressing method, the dry pressing method is advantageous for having short time required for the pressing step.

In the wet pressing method, for example, a slurry containing a magnetic powder has its liquid component removed while being pressed under a magnetic field application, whereby a green compact is formed and then fired. The wet pressing method is advantageous because the magnetic powder is easily oriented by the magnetic field during pressing, and magnetic characteristics of the sintered magnet are good.

CIM method is a method in which a pellet formed by heating and kneading a dried magnetic powder along with a binder resin is injection molded inside a metal mold applied with a magnetic field to obtain a preliminary green compact, and this preliminary green compact is fired after undergoing a debinding treatment.

Hereinafter, CIM and wet pressing will be described in detail.

(CIM and Firing)

In the case of obtaining the ferrite sintered magnet by CIM method, a finely pulverized slurry containing the magnetic powder is dried after the wet pulverizing. A drying temperature is preferably 80° C. to 500° C., and is more preferably 100° C. to 400° C. A drying time is preferably 1 second to 100 hours, and is more preferably 1 second to 50 hours. A moisture amount of the magnetic powder after drying is preferably not more than 1.0 mass %, and is more preferably not more than 0.5 mass %. An average particle diameter of primary particles of the magnetic powder after drying is preferably in a range of 0.08 µm to 2.0 µm, and is more preferably in a range of 0.1 µm to 1.0 µm.

This dried magnetic powder is kneaded along with the binder resin, a wax, a lubricant, a plasticizer, a sublimable compound, or the like (hereafter, these will be referred to as "organic components"), and is formed into a pellet by a pelletizer or so. The green compact preferably includes 35 volume percent to 60 volume percent of the organic components, and more preferably contains 40 volume percent to 55 volume percent of the organic components. The kneading can be performed by a kneader, for example. A twin screw extruder is employed as the pelletizer, for example. The kneading and pellet formation may be implemented while being heated depending on melting temperature of the organic components used.

A polymer compound such as a thermoplastic resin is employed as the binder resin, and polyethylene, polypropylene, ethylene-vinyl acetate copolymer, atactic polypropylene, acrylic polymer, polystyrene, polyacetal etc. are employed as the thermoplastic resin, for example.

Synthetic waxes such as paraffin wax, urethanized wax, and polyethylene glycol are employed as the wax in addition to natural waxes such as carnauba wax, montan wax, and beeswax.

For example, a fatty acid ester is employed as the lubricant. For example, a phthalic acid ester is employed as the plasticizer.

With respect to 100 mass % of the magnetic powder, an added amount of the binder resin is preferably 3 mass % to 20 mass %, an added amount of the wax is preferably 3 mass % to 20 mass %, and an added amount of the lubricant is preferably 0.1 mass % to 5 mass %. An added amount of the plasticizer is preferably 0.1 mass % to 5 mass % with respect to 100 mass % of the binder resin.

In the present embodiment, the above-mentioned pellet is injection molded into a metal mold using a magnetic field injection molding device, for example. Before injection molding into the metal mold, the metal mold is closed, has a cavity formed on its inside, and is applied with a magnetic field.

Incidentally, the pellet is heated and melted at 160° C. to 230° C., for example, inside the extruder, and is injected into the cavity of the metal mold by a screw. A temperature of the metal mold is 20° C. to 80° C. The magnetic field applied to the metal mold should be about 80 kA/m to 2000 kA/m.

Next, the preliminary green compact obtained by the CIM undergoes a heat treatment at 100° C. to 600° C. in the atmosphere or in nitrogen, and undergoes the debinding treatment, whereby the green compact is obtained.

The debinding treatment is preferably performed by appropriately adjusting a temperature increase rate of a temperature region where volatilization or decomposition occurs to a slow temperature increase rate of about 0.01° C./minute to 1° C./minute, depending on the organic components undergoing the debinding treatment. This prevents fractures or cracks of the green compact or sintered body and improves shape retention of the green compact. When using a plurality of kinds of the organic components, the debinding treatment may be performed by dividing it into a plurality of times.

Next, in the firing step, the ferrite sintered magnet according to the present invention is obtained by firing the green compact undergone the debinding treatment for about 0.2 hours to 3 hours at a temperature of, preferably, 1100° C. to 1250° C., and more preferably, 1160° C. to 1230° C., in the atmosphere, for example. By adopting the above-described firing temperature and firing temperature holding time, a sufficient sintered body density can be obtained, a reaction of added elements is sufficient, and the desired magnetic characteristics are obtained.

Incidentally, the firing step may be implemented continuously after the previously mentioned debinding step, or firing may be implemented after once performing the debinding treatment and then cooling to room temperature.

(Wet Pressing and Firing)

In the case of obtaining the ferrite sintered magnet by the wet pressing method, the pressing is preferably performed by performing the above-mentioned fine pulverizing step by wet to obtain a slurry, concentrating this slurry to a certain concentration to obtain a wet pressing-dedicated slurry, and using this slurry.

The slurry can be concentrated by a centrifugal separator, a filter press, or the like. The finely pulverized material preferably occupies the wet pressing-dedicated slurry by about 30 mass % to 80 mass % of its total amount.

In the slurry, water is preferable as the dispersion medium for dispersing the finely pulverized material. In this case, a surfactant such as gluconic acid, gluconate, and sorbitol may be added to the slurry. A non-aqueous solvent may be used as the dispersion medium. An organic solvent such as toluene and xylene can be used as the non-aqueous solvent. In this case, a surfactant such as oleic acid is preferably added.

Incidentally, the wet pressing-dedicated slurry may be prepared by adding the dispersion medium or so to the finely pulverized material in a dried state after the fine pulverizing.

In the wet pressing, this wet pressing-dedicated slurry subsequently undergoes pressing in a magnetic field. In that case, a pressing pressure is preferably about 9.8 MPa to 98 MPa (0.1 ton/cm$^2$ to 1.0 ton/cm$^2$), and an applied magnetic field should be about 400 kA/m to 1600 kA/m. A pressure direction and a magnetic field application direction during pressing may be identical directions or orthogonal directions.

The green compact obtained by the wet pressing can be fired in an oxidizing atmosphere of the atmosphere, or the like. A firing temperature is preferably 1050° C. to 1270° C., and is more preferably 1080° C. to 1240° C. A firing time (a time that the firing temperature is held) is preferably about 0.5 hours to 3 hours.

Incidentally, when the green compact is obtained by the above-mentioned wet pressing, cracks are preferably prevented from occurring by heating at a slow temperature increase rate of about 0.5° C./minute from room temperature to about 100° C. and sufficiently drying the green compact before taking the green compact to the previously mentioned firing temperature, for example.

Furthermore, when the surfactant (dispersant) or so is added, it is preferable to sufficiently remove these (degreasing treatment) by heating at a temperature increase rate of about 2.5° C./minute in a temperature range of about 100° C. to 500° C., for example. Incidentally, these treatments may be performed at the beginning of the firing step, or may be performed in advance separately earlier than the firing step.

That concludes description of the preferred method of manufacturing the ferrite sintered magnet, but the manufacturing method is not limited to that described above, and manufacturing conditions or so may be appropriately changed.

The ferrite sintered magnet obtained by the present invention has any form provided it has the composition of ferrite of the present invention. For example, the ferrite sintered magnet can have a variety of shapes, such as an arc segment shape having anisotropy, a flat plate shape, a circular columnar shape, and a cylindrical shape. In the ferrite sintered magnet of the present invention, high Hk/HcJ can be obtained while maintaining high Br and HcJ regardless of the shape of the magnet, particularly in spite of having an arc segment shape.

The ferrite sintered magnet in the present embodiment can be used for a general motor, a rotary machine, a sensor, and the like.

For example, the ferrite sintered magnet in the present embodiment can be used as a member of a motor for an automobile, such as for fuel pump, power window, anti-lock brake system (ABS), fan, wiper, power steering, active suspension, starter, door lock, and electric mirror.

In addition, the ferrite sintered magnet in the present embodiment can be used as a member of a motor for OA/AV equipment, such as for FDD spindle, VTR capstan, VTR rotary head, VTR reel, VTR loading, VTR camera capstan, VTR camera rotary head, VTR camera zoom, VTR camera focus, capstan of radio cassette recorder, CD/DVD/MD spindle, CD/DVD/MD loading, and CD/DVD optical pickup.

Furthermore, the ferrite sintered magnet in the present embodiment can be used as a member of a motor for a household electrical appliance, such as for air conditioner compressor, freezer compressor, electric tool drive, dryer fan, shaver drive, and electric toothbrush. Moreover, the ferrite sintered magnet in the present embodiment can be used as a member of a motor for FA equipment, such as for robot axis, joint drive, robot main drive, machine tool table drive, and machine tool belt drive.

Examples of other applications include members of dynamo for motorcycle, magnet for speaker/headphone, magnetron tube, MRI-dedicated magnetic field generating device, clamper for CD-ROM, sensor for distributor, sensor for ABS, fuel/oil level sensor, magneto-latch, isolator, generator, and the like. Alternatively, the ferrite sintered magnet in the present embodiment can also be employed as a target (pellet) when forming a magnetic layer of a magnetic recording medium by a vapor deposition method, a sputtering method, or the like.

EXAMPLES

Hereinafter, the present invention will be described based on even more detailed Examples, but is not limited to these Examples.

Example 1

<Blending Step>

$CaCO_3$, $La_2O_3$, $SrCO_3$, $Fe_2O_3$, $Co_3O_4$, and MnO were prepared as raw materials and weighed such that compositions of each sample described in Table 1 to Table 4 were achieved. Moreover, 0.35 mass % of $SiO_2$ as a Si component was weighed with respect to 100 mass % of the raw materials.

Incidentally, in Table 1, samples in which the atomic ratio of Mn (a) was changed were produced. In Table 2, samples in which the atomic ratio of Co (m) was changed were produced. In Table 3, samples in which the atomic ratio of La (w) was changed were produced. In Table 4, samples in which the "A" element kind and the atomic ratio of "A" (x) were changed were produced.

Respective powders of the previously described raw materials and $SiO_2$ were mixed and pulverized by a wet attritor, and a slurry form raw material mixture was obtained.

<Calcining Step>

After this raw material mixture was dried, a calcining treatment for holding it for 2 hours at 1200° C. in the atmosphere was performed to obtain a calcined body.

<Pulverizing Step>

The obtained calcined body was coarsely pulverized by a rod mill, and a coarsely pulverized material was obtained. $CaCO_3$, $La_2O_3$, $SrCO_3$, $Fe_2O_3$, $Co_3O_4$, MnO, and $SiO_2$ were respectively appropriately added to the obtained coarsely pulverized material such that the metal elements configuring the fired ferrite sintered magnet had ratios indicated in each sample described in Table 1 to Table 4.

Next, a fine pulverizing was performed for 28 hours by a wet ball mill, and a slurry was obtained. The obtained slurry was made into a wet pressing-dedicated slurry by adjusting its solid content concentration to 70 to 75 mass %.

<Pressing and Firing Steps>

Next, a preliminary green compact was obtained using a wet magnetic field pressing machine. The pressing pressure was 50 MPa, and the applied magnetic field was 800 kA/m. In addition, the pressure direction and the magnetic field application direction during pressing were identical directions. The preliminary green compact obtained by the wet pressing was disc-shaped, and had a diameter of 30 mm and a height of 15 mm.

The preliminary green compact was fired while being held for 1 hour at 1190° C. to 1230° C. in the atmosphere, and a ferrite sintered magnet being a sintered body was obtained.

Example 2

In Example 2, a ferrite sintered magnet was obtained similarly to in Example 1, except that Sr and Ba were used as the "A" element kind, the atomic ratio of Sr was 0.08, the atomic ratio of Ba was 0.07, and the atomic ratio x of "A" was 0.15 (=0.08+0.07), as shown in Table 5.

Example 3

In Example 3, a ferrite sintered magnet was obtained similarly to in Example 1, except that samples in which the atomic ratio of Fe (z) was changed were produced, as shown in Table 6.

Example 4

In Example 4, a calcined body was obtained similarly to in Example 1 by preparing $SiO_2$ in addition to the raw materials and weighing $SiO_2$ to have compositions of each sample described in Table 7 in the blending step and by mixing a powder of $SiO_2$ in addition to the raw materials with the wet attritor and so on in the calcining step. In Example 4, a ferrite material powder was obtained similarly to in Example 1 by appropriately adding $CaCO_3$, $La_2O_3$, $SrCO_3$, $Fe_2O_3$, $Co_3O_4$, MnO, and $SiO_2$ to the obtained coarsely pulverized material so as to have values indicated in each sample described in Table 7 and so on in the pulverizing step. In Example 4, a ferrite sintered magnet was obtained similarly to in Example 1 except for the above-mentioned steps.

Example 5

In Example 5, a calcined body was obtained similarly to in Example 1 by preparing $Cr_2O_3$ in addition to the raw materials and weighing $Cr_2O_3$ to have compositions of each sample described in Table 8 in the blending step, and by mixing a powder of $Cr_2O_3$ in addition to the raw materials with the wet attritor and so on in the calcining step. In Example 5, a ferrite material powder was obtained similarly to in Example 1 by appropriately adding $CaCO_3$, $La_2O_3$, $SrCO_3$, $Fe_2O_3$, $CO_3O_4$, MnO, and $Cr_2O_3$ to the obtained coarsely pulverized material so as to have values indicated in each samples described in Table 8 and so on in the pulverizing step. In Example 5, a ferrite sintered magnet was obtained similarly to in Example 1 except for the above-mentioned steps.

Each of the ferrite sintered magnets of Example 1 to Example 5 underwent a fluorescent X-ray quantitative analysis, and was confirmed to have the compositions respectively shown in Table 1 to Table 8.

Incidentally, each of the ferrite sintered magnets of Table 1 to Table 8 had the composition of $Ca_{1-w-x}La_wA_xFe_zCo_m$-$Mn_aO_{19}$.

Each of the ferrite sintered magnets of Table 1 was fixed at "A"=Sr, w=0.39, x=0.14, z=9.05, m=0.25, w/m=1.6, and $SiO_2$=0.81 mass %.

Each of the ferrite sintered magnets of Table 2 was fixed at "A"=Sr, w=0.39, x=0.14, z=9.05, "a"=0.061, and $SiO_2$=0.81 mass %.

Each of the ferrite sintered magnets of Table 3 was fixed at "A"=Sr, x=0.14, z=9.05, m=0.25, "a"=0.061, and $SiO_2$=0.81 mass %.

Each of the ferrite sintered magnets of Table 4 was fixed at w=0.39, z=8.95, m=0.25, w/m=1.6, "a"=0.061, and $SiO_2$=0.81 mass %.

Each of the ferrite sintered magnets of Table 5 was fixed at w=0.39, x=0.15, z=8.95, m=0.25, w/m=1.6, "a"=0.061, and $SiO_2$=0.81 mass %.

Each of the ferrite sintered magnets of Table 6 was fixed at "A"=Sr, w=0.39, x=0.14, m=0.25, w/m=1.6, "a"=0.061, and $SiO_2$=0.81 mass %.

Each of the ferrite sintered magnets of Table 7 was fixed at "A"=Sr, w=0.39, x=0.14, z=8.95, m=0.25, w/m=1.6, and "a"=0.061.

Each of the ferrite sintered magnets of Table 8 was fixed at "A"=Sr, w=0.39, x=0.14, z=8.95, m=0.25, w/m=1.6, "a"=0.061, and $SiO_2$=0.81 mass %.

The main phase of each of the ferrite sintered magnets of Table 1 to Table 8 was confirmed to be a ferrite phase having a hexagonal crystal structure by X-ray diffraction measurement.

<Measurement of Magnetic Characteristics (Br, HcJ, Hk)>

After processing upper and lower surfaces of each of the ferrite sintered magnets of Example 1 to Example 5, the magnetic characteristics (residual magnetic flux density Br, coercivity HcJ, and squareness ratio Hk/HcJ) were measured using a B—H tracer of maximum applied magnetic field 1989 kA/m in an atmosphere of air at 25° C. Table 1 to Table 7 show the results of Example 1 to Example 4. The results of Example 5 will be mentioned later. Now, Hk is an external magnetic field intensity at a time when magnetic flux density is 90% of residual magnetic flux density in a second quadrant of a magnetic hysteresis loop.

<Formability>

Formability was evaluated by the following method.

Each of 100 ferrite sintered magnets of Example 1 to Example 5 was observed. The case where a magnet had 0 to 5 fractures, breaks, or cracks was considered to be best and denoted by A, the case where a magnet had 5 to 10 fractures, breaks, or cracks was considered to be extremely good and denoted by B, the case where a magnet had 11 to 15 fractures, breaks, or cracks was considered to be good and denoted by C, and the case where a magnet had 16 or more fractures, breaks, or cracks was considered to be bad and denoted by D. The results are shown in Table 1 and Table 8, and the other results except Table 1 or Table 8 will be described later.

Table 1 to Table 7 show evaluation results of compositions and magnetic characteristics of each sample of Example 1 to Example 4.

Table 8 shows evaluation results of compositions and formability of each sample of Example 1 to Example 4.

Figure 2A:
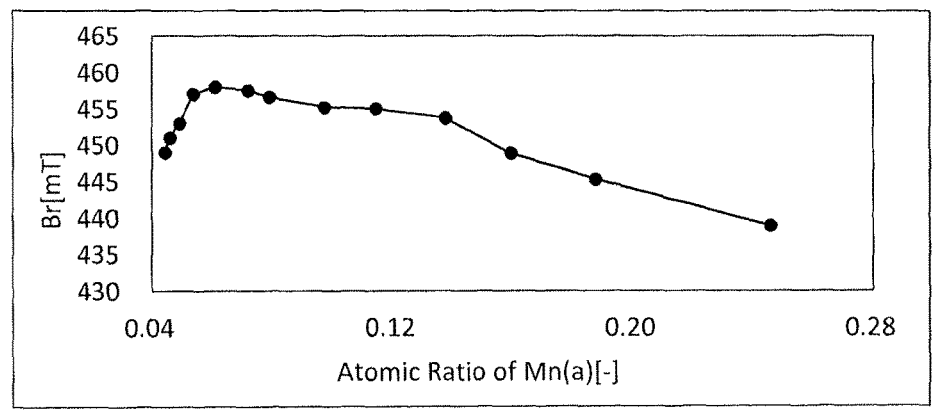
FIG. 2A is a graph showing a relationship between an atomic ratio of Mn (a) and Br.
Figure 2B:
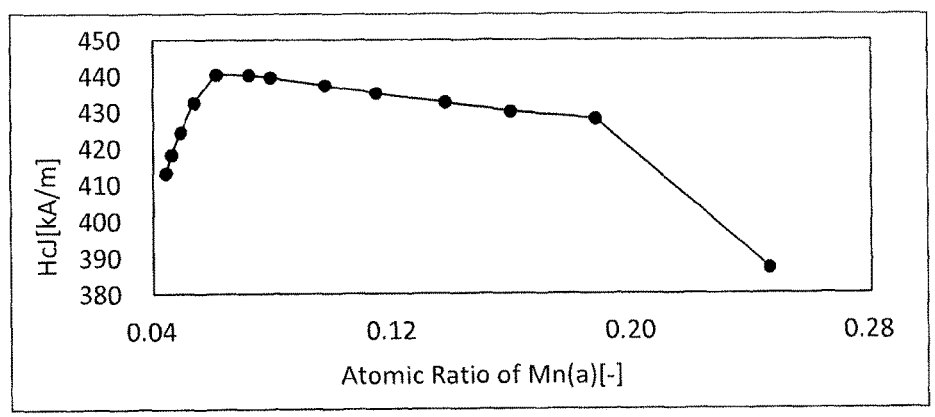
FIG. 2B is a graph showing a relationship between an atomic ratio of Mn (a) and HcJ.
Figure 2C:
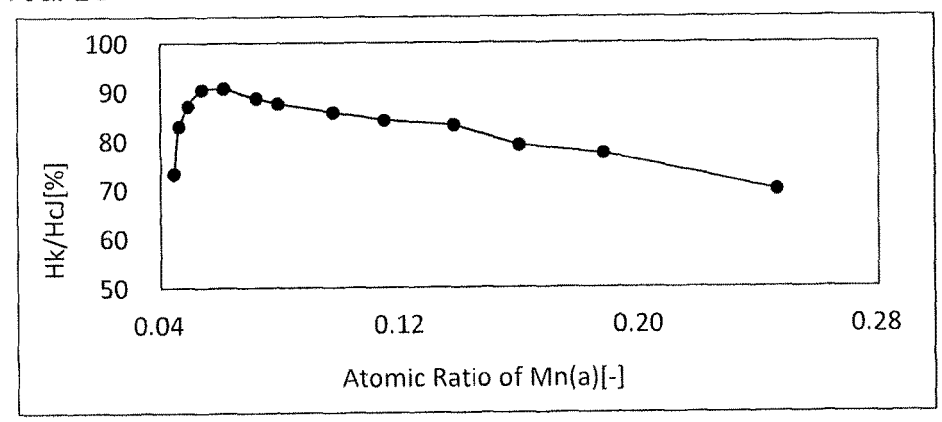
FIG. 2C is a graph showing a relationship between an atomic ratio of Mn (a) and Hk/HcJ.
Figure 7A:
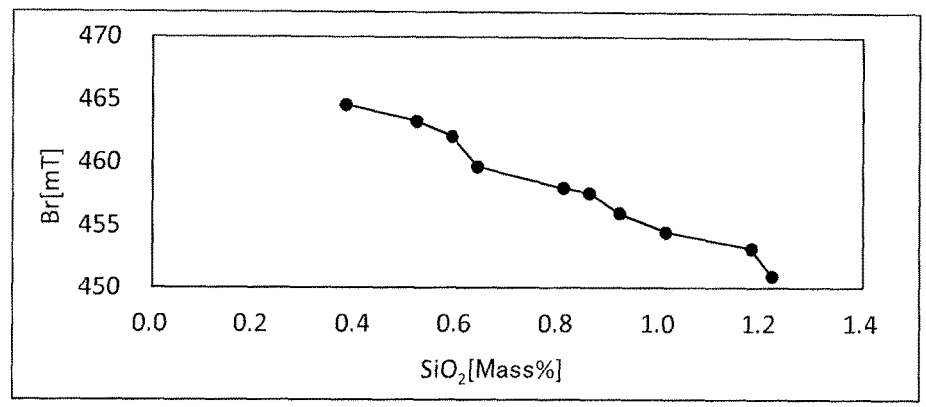
FIG. 7A is a graph showing a relationship between an amount of $SiO_2$ and Br.
Figure 7B:
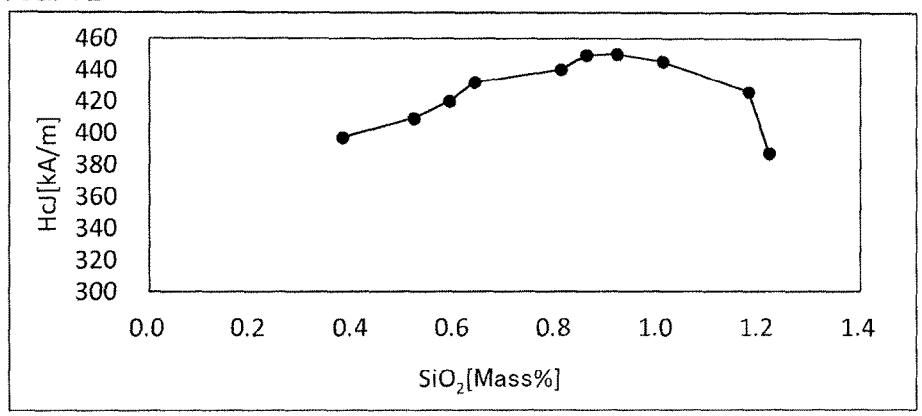
FIG. 7B is a graph showing a relationship between an amount of $SiO_2$ and HcJ.
Figure 7C:
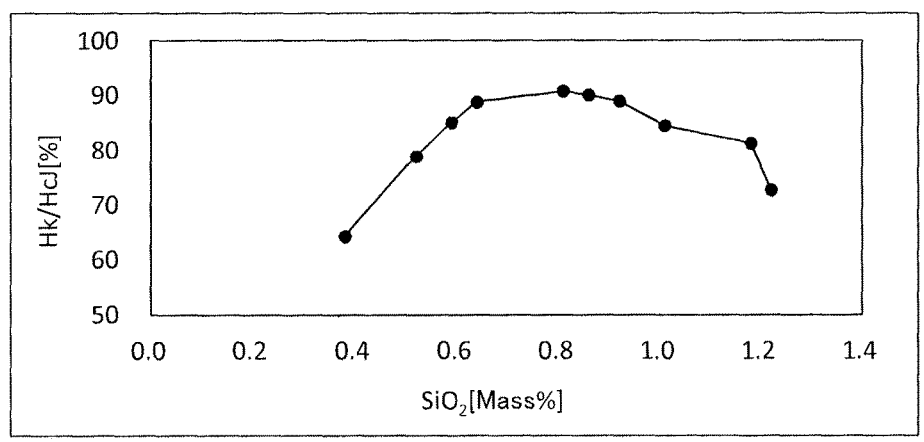
FIG. 7C is a graph showing a relationship between an amount of $SiO_2$ and Hk/HcJ.

FIGS. 2 (2A, 2B, and 2C) to FIGS. 7 (7A, 7B, and 7C) show compositions and magnetic characteristics of each sample of Example 1 to Example 4.

TABLE 1

| Sample Number | Mn (a) | Br [mT] | HcJ [kA/m] | Hk/HcJ [%] | Formability |
|---|---|---|---|---|---|
| 1 | 0.044 | 449.0 | 413.2 | 73.2 | D |
| 2 | 0.046 | 451.0 | 418.2 | 83.0 | C |
| 3 | 0.049 | 453.0 | 424.3 | 87.1 | C |
| 4 | 0.054 | 457.0 | 432.5 | 90.5 | A |
| 5 | 0.061 | 458.0 | 440.4 | 90.8 | A |
| 6 | 0.072 | 457.5 | 440.3 | 88.7 | A |
| 7 | 0.079 | 456.6 | 439.5 | 87.6 | A |
| 8 | 0.097 | 455.2 | 437.3 | 85.8 | B |
| 9 | 0.114 | 455.0 | 435.1 | 84.2 | B |
| 10 | 0.137 | 453.7 | 432.6 | 83.2 | C |
| 11 | 0.160 | 448.9 | 430.0 | 79.1 | C |
| 12 | 0.188 | 445.3 | 428.0 | 77.4 | C |
| 13 | 0.246 | 438.9 | 387.0 | 69.8 | D |

Composition: $Ca_{1-w-x}La_wA_xFe_zCo_mMn_aO_{19}$
fixed at "A" = Sr, w = 0.39, x = 0.14, z = 9.05, m = 0.25, w/m = 1.6, $SiO_2$ = 0.81 mass %
A—best, B—extremely good, C—good, D—bad

TABLE 2

| Sample Number | Co (m) | La/Co (w/m) | Br [mT] | HcJ [kA/m] | Hk/HcJ [%] |
|---|---|---|---|---|---|
| 21 | 0.14 | 2.79 | 435.2 | 330.1 | 90.1 |
| 22 | 0.18 | 2.17 | 451.2 | 416.2 | 85.1 |
| 23 | 0.21 | 1.86 | 455.3 | 426.1 | 89.8 |
| 24 | 0.23 | 1.70 | 457.1 | 431.4 | 90.0 |
| 25 | 0.25 | 1.56 | 458.0 | 440.4 | 90.8 |
| 26 | 0.28 | 1.39 | 459.2 | 445.2 | 88.2 |
| 27 | 0.31 | 1.26 | 459.6 | 455.7 | 83.2 |
| 28 | 0.36 | 1.08 | 458.7 | 447.8 | 81.2 |
| 29 | 0.41 | 0.95 | 457.6 | 427.0 | 76.8 |
| 30 | 0.52 | 0.75 | 445.3 | 350.6 | 68.9 |

Composition: $Ca_{1-w-x}La_wA_xFe_zCo_mMn_aO_{19}$
fixed at "A" = Sr, w = 0.39, x = 0.14, z = 9.05, a = 0.061, $SiO_2$ = 0.81 mass %

TABLE 3

| Sample Number | La (w) | Ca (1-w-x) | La/Co (w/m) | Br [mT] | HcJ [kA/m] | Hk/HcJ [%] |
|---|---|---|---|---|---|---|
| 31 | 0.08 | 0.78 | 0.32 | 418.7 | 328.7 | 89.7 |
| 32 | 0.21 | 0.65 | 0.84 | 442.1 | 414.2 | 88.6 |
| 33 | 0.24 | 0.62 | 0.96 | 454.0 | 416.5 | 88.9 |
| 34 | 0.31 | 0.55 | 1.24 | 457.0 | 423.1 | 89.1 |
| 35 | 0.34 | 0.52 | 1.36 | 457.5 | 437.2 | 89.6 |
| 36 | 0.39 | 0.47 | 1.56 | 458.0 | 440.4 | 90.8 |
| 37 | 0.44 | 0.42 | 1.76 | 456.8 | 442.5 | 90.1 |
| 38 | 0.51 | 0.35 | 2.04 | 455.3 | 443.6 | 87.8 |
| 39 | 0.56 | 0.30 | 2.24 | 452.3 | 415.1 | 84.8 |
| 40 | 0.62 | 0.24 | 2.48 | 451.1 | 390.1 | 80.2 |
| 41 | 0.69 | 0.17 | 2.76 | 435.2 | 294.0 | 71.0 |

Composition: $Ca_{1-w-x}La_wA_xFe_zCo_mMn_aO_{19}$ fixed at "A" = Sr, x = 0.14, z = 9.05, m = 0.25, a = 0.061, $SiO_2$ = 0.81 mass %

TABLE 4

| Sample Number | "A" Element Kind | "A" (x) | Ca (1-w-x) | Br [mT] | HcJ [kA/m] | Hk/HcJ [%] |
|---|---|---|---|---|---|---|
| 51 | Sr | 0.01 | 0.60 | 450.2 | 347.3 | 51.6 |
| 52 | Sr | 0.02 | 0.59 | 451.4 | 382.5 | 76.3 |
| 53 | Sr | 0.04 | 0.57 | 454.0 | 417.2 | 81.2 |
| 54 | Sr | 0.07 | 0.54 | 456.2 | 432.0 | 85.0 |
| 55 | Sr | 0.11 | 0.50 | 457.3 | 437.1 | 85.3 |
| 56 | Sr | 0.13 | 0.48 | 458.2 | 439.8 | 88.0 |
| 57 | Sr | 0.15 | 0.46 | 458.0 | 440.4 | 90.8 |
| 58 | Sr | 0.17 | 0.44 | 457.9 | 438.5 | 87.1 |
| 59 | Sr | 0.20 | 0.41 | 457.8 | 432.5 | 86.1 |
| 60 | Sr | 0.23 | 0.38 | 457.0 | 427.6 | 86.4 |
| 61 | Sr | 0.26 | 0.35 | 456.2 | 419.4 | 86.3 |
| 62 | Sr | 0.32 | 0.29 | 455.1 | 409.0 | 85.5 |
| 63 | Sr | 0.46 | 0.15 | 454.5 | 356.7 | 86.1 |
| 64 | Sr | 0.56 | 0.05 | 454.1 | 270.7 | 86.0 |
| 65 | Ba | 0.05 | 0.56 | 453.2 | 413.8 | 81.3 |
| 66 | Ba | 0.07 | 0.54 | 454.6 | 432.3 | 87.9 |
| 67 | Ba | 0.10 | 0.51 | 455.8 | 434.8 | 88.5 |
| 68 | Ba | 0.15 | 0.46 | 457.3 | 437.6 | 89.2 |
| 69 | Ba | 0.21 | 0.40 | 456.0 | 433.3 | 86.2 |
| 70 | Ba | 0.25 | 0.36 | 455.5 | 415.8 | 85.7 |

Composition: $Ca_{1-w-x}La_wA_xFe_zCo_mMn_aO_{19}$ fixed at w = 0.39, z = 8.95, m = 0.25, w/m = 1.6, a = 0.061, $SiO_2$ = 0.81 mass %

TABLE 5

| Sample Number | "A" Element Kind | "A"(x) Sr | "A"(x) Ba | Br [mT] | HcJ [kA/m] | Hk/HcJ [%] |
|---|---|---|---|---|---|---|
| 71 | Sr + Ba | 0.08 | 0.07 | 458.2 | 438.7 | 88.2 |

Composition: $Ca_{1-w-x}La_wA_xFe_zCo_mMn_aO_{19}$ fixed at w = 0.39, x = 0.15, z = 8.95, m = 0.25, w/m = 1.6, a = 0.061, $SiO_2$ = 0.81 mass %

TABLE 6

| Sample Number | Fe (z) | Br [mT] | HcJ [kA/m] | Hk/HcJ [%] |
|---|---|---|---|---|
| 81 | 6.20 | 429.7 | 347.8 | 74.8 |
| 82 | 7.43 | 439.7 | 376.5 | 78.1 |
| 83 | 8.02 | 445.5 | 401.1 | 85.2 |
| 84 | 8.24 | 448.1 | 415.2 | 86.0 |
| 85 | 8.51 | 452.2 | 425.3 | 86.8 |
| 86 | 8.72 | 455.8 | 432.2 | 90.0 |
| 87 | 9.05 | 458.0 | 440.4 | 90.8 |
| 88 | 9.21 | 457.9 | 439.2 | 91.1 |
| 89 | 9.52 | 457.9 | 437.6 | 90.2 |
| 90 | 9.81 | 457.0 | 435.1 | 89.0 |
| 91 | 10.05 | 456.7 | 433.3 | 88.6 |
| 92 | 10.23 | 455.2 | 427.1 | 89.1 |
| 93 | 10.51 | 453.6 | 416.8 | 89.5 |
| 94 | 10.65 | 452.8 | 410.1 | 88.5 |

TABLE 6-continued

| Sample Number | Fe (z) | Br [mT] | HcJ [kA/m] | Hk/HcJ [%] |
|---|---|---|---|---|
| 95 | 11.03 | 452.2 | 392.3 | 87.2 |
| 96 | 11.45 | 451.0 | 317.1 | 88.5 |

Composition: $Ca_{1-w-x}La_wA_xFe_zCo_mMn_aO_{19}$
fixed at "A" = Sr, w = 0.39, x = 0.14, m = 0.25, w/m = 1.6, a = 0.061, $SiO_2$ = 0.81 mass %

TABLE 7

| Sample Number | $SiO_2$ [mass %] | Br [mT] | HcJ [kA/m] | Hk/HcJ [%] |
|---|---|---|---|---|
| 101 | 0.38 | 464.6 | 397.1 | 64.3 |
| 102 | 0.52 | 463.3 | 409.0 | 78.9 |
| 103 | 0.59 | 462.1 | 420.0 | 85.1 |
| 104 | 0.64 | 459.7 | 432.1 | 88.8 |
| 105 | 0.81 | 458.0 | 440.4 | 90.8 |
| 106 | 0.86 | 457.6 | 449.5 | 90.1 |
| 107 | 0.92 | 456.0 | 450.1 | 89.0 |
| 108 | 1.01 | 454.5 | 445.4 | 84.5 |
| 109 | 1.18 | 453.2 | 426.0 | 81.3 |
| 110 | 1.22 | 451.0 | 387.3 | 72.7 |

Composition: $Ca_{1-w-x}La_wA_xFe_zCo_mMn_aO_{19}$
fixed at "A" = Sr, w = 0.39, x = 0.14, z = 8.95, m = 0.25, a = 0.061

TABLE 8

| Sample Number | $Cr_2O_3$ [mass %] | Formability |
|---|---|---|
| 111 | 0.00 | A |
| 112 | 0.01 | A |
| 113 | 0.03 | A |
| 114 | 0.04 | A |
| 115 | 0.05 | A |
| 116 | 0.08 | A |
| 117 | 0.10 | B |
| 118 | 0.15 | B |
| 119 | 0.30 | B |
| 120 | 0.50 | C |
| 121 | 0.98 | C |

Composition: $Ca_{1-w-x}La_wA_xFe_zCo_mMn_aO_{19}$
fixed at "A" = Sr, w = 0.39, x = 0.14, z = 9.05, m = 0.25, a = 0.061, $SiO_2$ = 0.81 mass %
A—best, B—extremely good, C—good, D—bad From Table 1 and FIGS. 2 (2A, 2B, and 2C), it was confirmed that the range of the atomic ratio of Mn (a) is preferably 0.046≤a≤0.188.

Figure 3A:
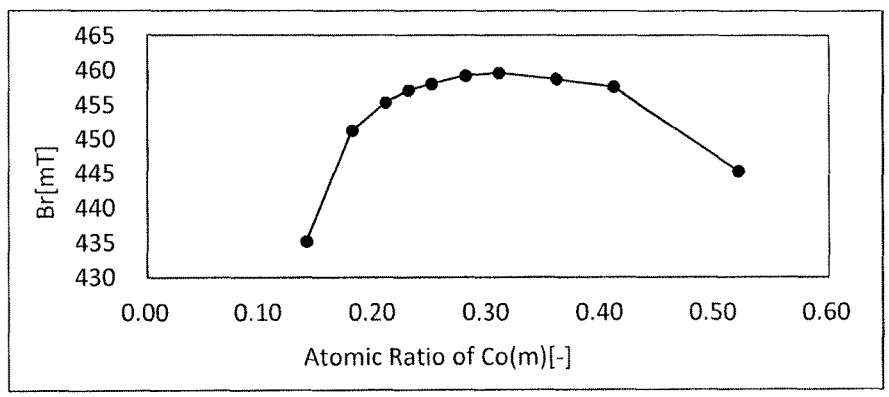
FIG. 3A is a graph showing a relationship between an atomic ratio of Co (m) and Br.
Figure 3B:
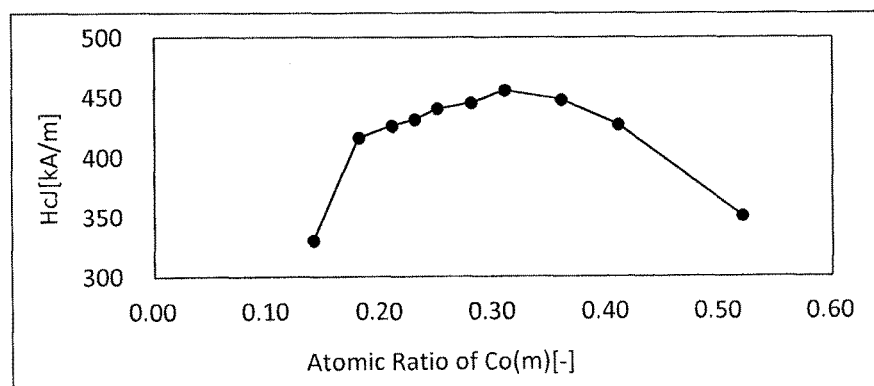
FIG. 3B is a graph showing a relationship between an atomic ratio of Co (m) and HcJ.
Figure 3C:
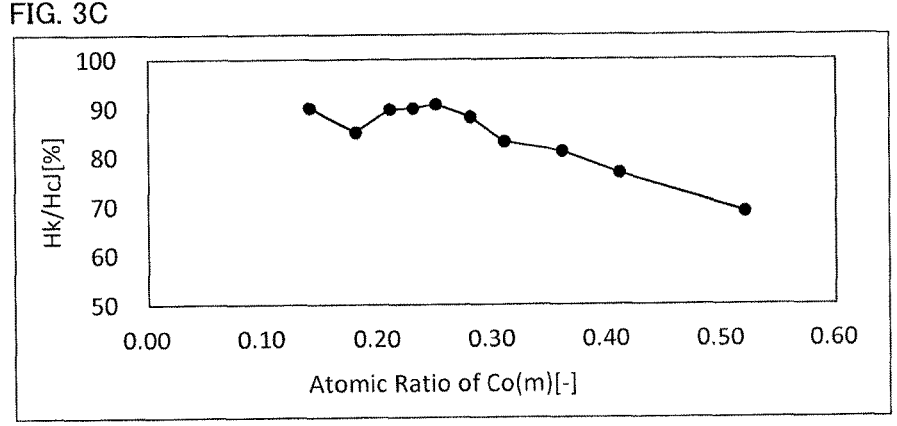
FIG. 3C is a graph showing a relationship between an atomic ratio of Co (m) and Hk/HcJ.

From Table 2 and FIGS. 3 (3A, 3B, and 3C), it was confirmed that the range of the atomic ratio of Co (m) is preferably 0.18≤m≤0.41. Incidentally, each sample of Table 2 had any of formality of A to C.

Figure 4A:
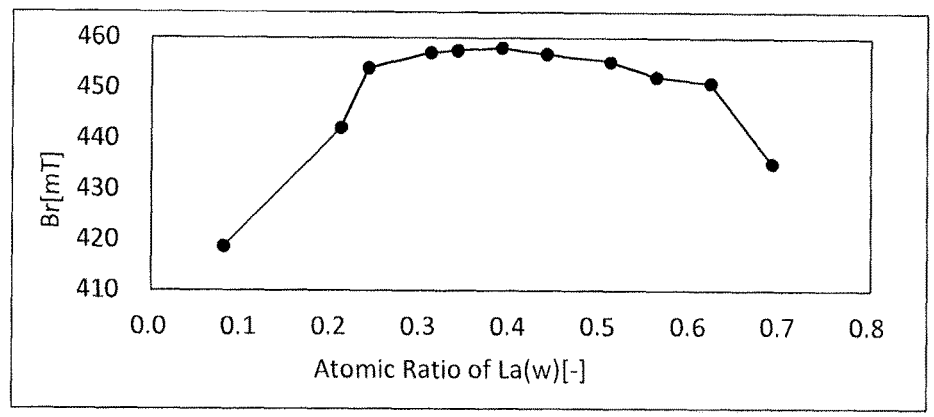
FIG. 4A is a graph showing a relationship between an atomic ratio of La (w) and Br.
Figure 4B:
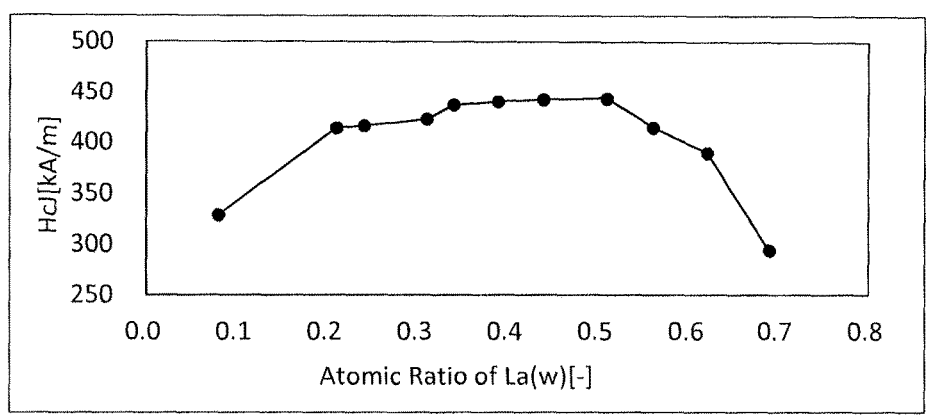
FIG. 4B is a graph showing a relationship between an atomic ratio of La (w) and HcJ.
Figure 4C:
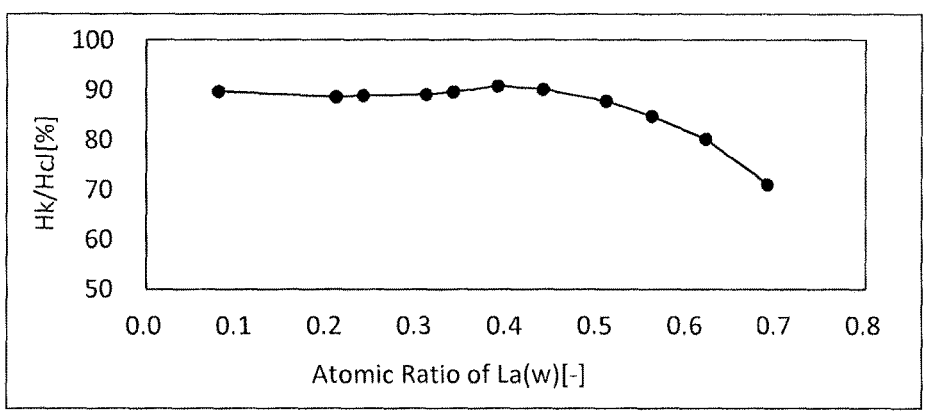
FIG. 4C is a graph showing a relationship between an atomic ratio of La (w) and Hk/HcJ.

From Table 3 and FIGS. 4 (4A, 4B, and 4C), it was confirmed that the range of the atomic ratio of La (w) is preferably 0.21≤w≤0.62. Incidentally, each sample of Table 3 had any of formality of A to C.

From Table 2 and Table 3, it was confirmed that the range of La/Co (w/m) is preferably 0.84 to 2.48.

Figure 5A:
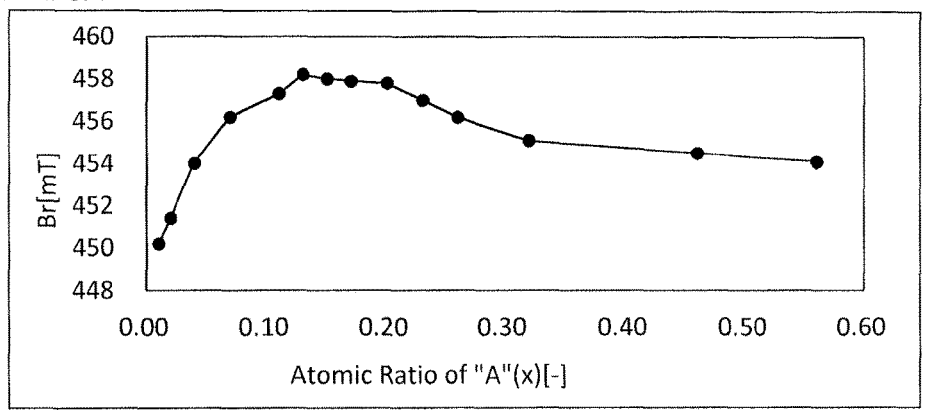
FIG. 5A is a graph showing a relationship between an atomic ratio of "A" (x) and Br.
Figure 5B:
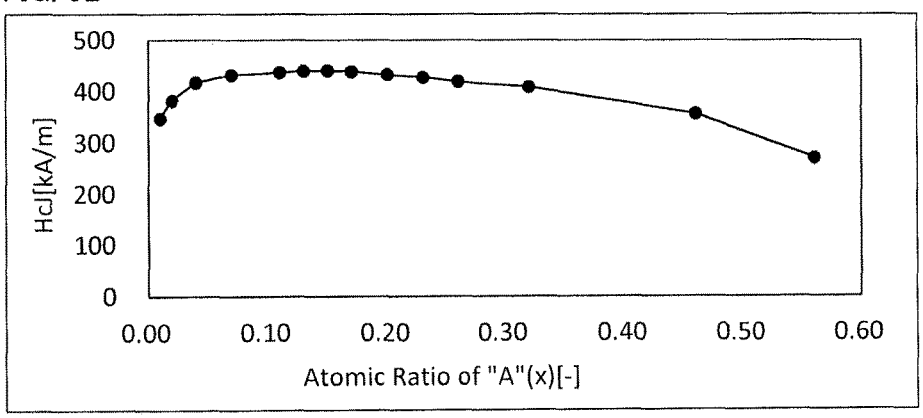
FIG. 5B is a graph showing a relationship between an atomic ratio of "A" (x) and HcJ.
Figure 5C:
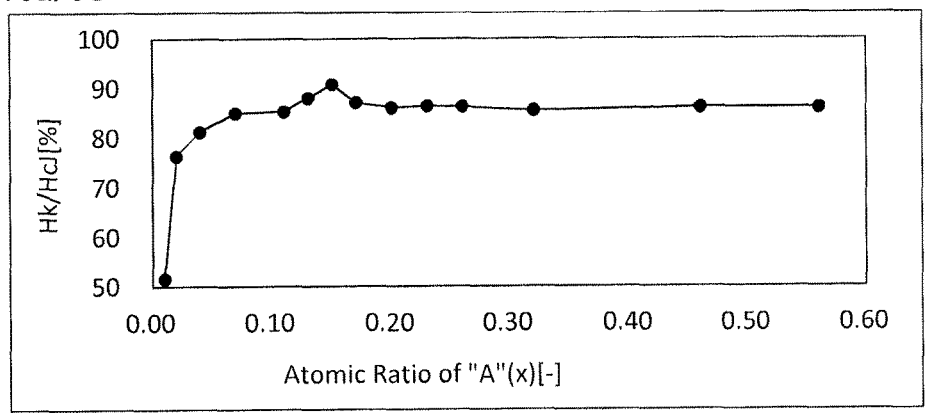
FIG. 5C is a graph showing a relationship between an atomic ratio of "A" (x) and Hk/HcJ.

From Table 4, Table 5, and FIG. 5 (5A, 5B, and 5C), it was confirmed that when the "A" element kind is at least one kind of element selected from a group consisting of Sr and Ba, the range of the atomic ratio of "A" (x) is preferably 0.02≤x≤0.46. Incidentally, each sample of Table 4 and Table 5 had any of formality of A to C.

Figure 6A:
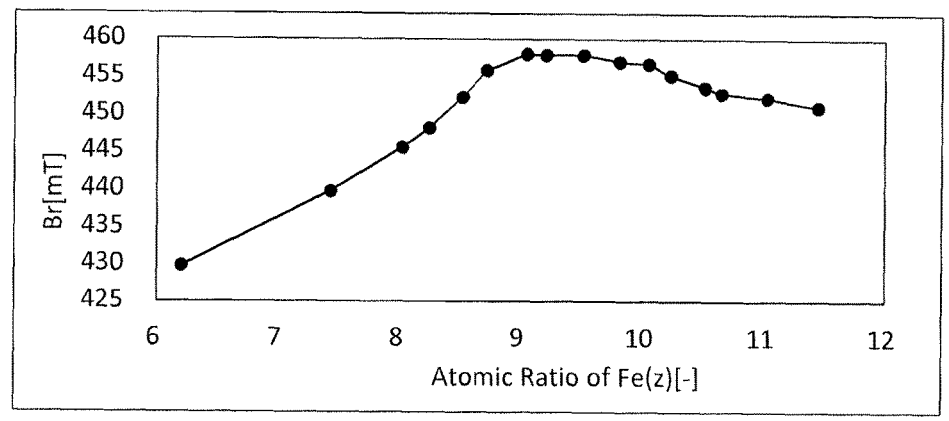
FIG. 6A is a graph showing a relationship between an atomic ratio of Fe (z) and Br.
Figure 6B:
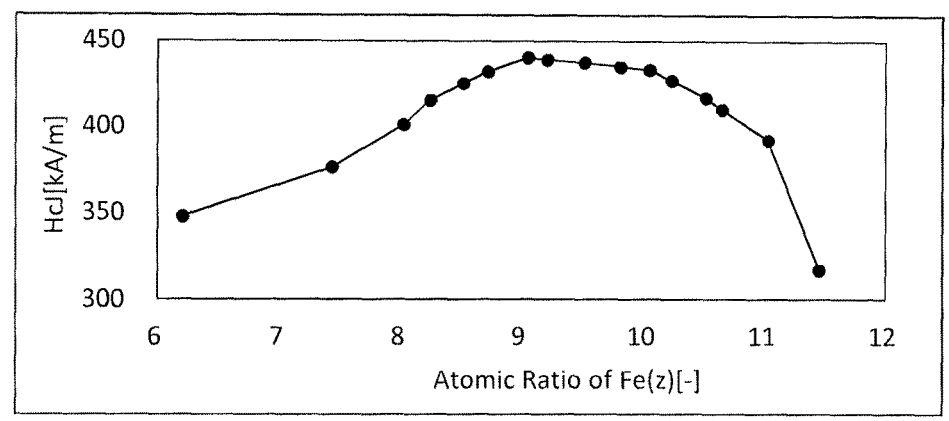
FIG. 6B is a graph showing a relationship between an atomic ratio of Fe (z) and HcJ.
Figure 6C:
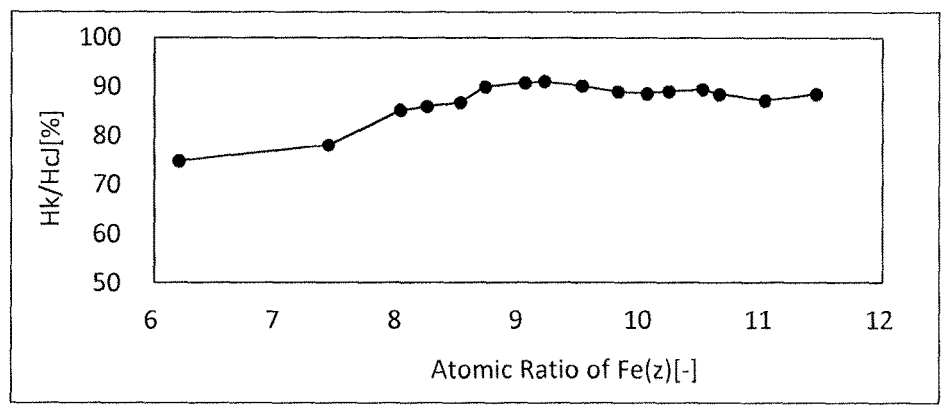
FIG. 6C is a graph showing a relationship between an atomic ratio of Fe (z) and Hk/HcJ.

From Table 6 and FIG. 6 (6A, 6B, and 6C), it was confirmed that the atomic ratio of Fe (z) is preferably in a range of 7.43≤z≤11.03. Incidentally, each sample of Table 6 had any of formality of A to C.

From Table 7 and FIG. 7 (7A, 7B, and 7C), it was confirmed that the range of the amount of $SiO_2$ is preferably 0.52 mass % to 1.18 mass %. Incidentally, each sample of Table 7 had any of formality of A to C.

From Table 8, it was confirmed that the range of the amount of $Cr_2O_3$ is preferably 0.98 mass % or less. Incidentally, regarding the magnetic characteristics of each ferrite sintered magnet of Table 8, Br was 439 mT or more, and HcJ was 352 kA/m or more.

DESCRIPTION OF THE NUMERALS

10 . . . ferrite sintered magnet
The invention claimed is:
1. A ferrite sintered magnet comprising a composition expressed by a following formula (1), $$Ca_{1-w-x}La_wA_xFe_zCo_mMn_aO_{19} \quad (1)$$

wherein "w", "x", "z", "m", and "a" in the formula (1) satisfy following formulae (2), (3), (4), (5), and (6) and $$0.21 \leq w \leq 0.62 \quad (2)$$

$$0.02 \leq x \leq 0.46 \quad (3)$$

$$7.43 \leq z \leq 11.03 \quad (4)$$

$$0.18 \leq m \leq 0.41 \quad (5)$$

$$0.046 \leq a \leq 0.188 \quad (6)$$

"A" in the formula (1) is at least one kind of element selected from a group consisting of Sr and Ba.
2. The ferrite sintered magnet according to claim 1, wherein w/m is 0.84 to 2.48.
3. The ferrite sintered magnet according to claim 1, wherein Si is further contained at 0.52 mass % to 1.18 mass % in terms of $SiO_2$.
4. The ferrite sintered magnet according to claim 2, wherein Si is further contained at 0.52 mass % to 1.18 mass % in terms of $SiO_2$.
5. The ferrite sintered magnet according to claim 1, wherein Cr is further contained at 0.98 mass % or less in terms of $Cr_2O_3$.
6. The ferrite sintered magnet according to claim 2, wherein Cr is further contained at 0.98 mass % or less in terms of $Cr_2O_3$.
7. The ferrite sintered magnet according to claim 3, wherein Cr is further contained at 0.98 mass % or less in terms of $Cr_2O_3$.
8. The ferrite sintered magnet according to claim 4, wherein Cr is further contained at 0.98 mass % or less in terms of $Cr_2O_3$.

* * * * *